(12) United States Patent
Choi et al.

(10) Patent No.: US 9,110,201 B2
(45) Date of Patent: Aug. 18, 2015

(54) METAMATERIAL STRUCTURE

(71) Applicant: ELECTRONICS AND TELECOMMUNICATIONS RESEARCH INSTITUTE, Daejeon (KR)

(72) Inventors: Choongi Choi, Daejeon (KR); Jongho Choe, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/493,330

(22) Filed: Sep. 22, 2014

(65) Prior Publication Data

US 2015/0085347 A1    Mar. 26, 2015

(30) Foreign Application Priority Data

Sep. 23, 2013 (KR) ........................ 10-2013-0112606

(51) Int. Cl.
*G02B 1/00* (2006.01)
*G02F 1/35* (2006.01)
*G02F 1/355* (2006.01)
*B82Y 20/00* (2011.01)

(52) U.S. Cl.
CPC ................ *G02B 1/002* (2013.01); *G02F 1/353* (2013.01); *G02F 1/355* (2013.01); *B82Y 20/00* (2013.01); *Y10S 977/774* (2013.01)

(58) Field of Classification Search
CPC ........ G02B 1/002; G02B 1/005; G02F 1/353; G02F 1/355
See application file for complete search history.

(56) References Cited

U.S. PATENT DOCUMENTS

| | | | | |
|---|---|---|---|---|
| 6,468,823 | B1 * | 10/2002 | Scherer et al. | 438/31 |
| 7,206,488 | B1 * | 4/2007 | Altug et al. | 385/131 |
| 7,778,296 | B1 * | 8/2010 | Vuckovic et al. | 372/41 |
| 8,194,302 | B2 * | 6/2012 | Bratkovski | 359/240 |
| 8,885,247 | B2 * | 11/2014 | Letartre et al. | 359/326 |

\* cited by examiner

*Primary Examiner* — Daniel Petkovsek
(74) *Attorney, Agent, or Firm* — Rabin & Berdo, P.C.

(57) ABSTRACT

This invention relates to a metamaterial structure, which can simultaneously cause resonance at a wavelength of light that excites quantum dots and a wavelength of light produced by the quantum dots in a local space where quantum dots are located. The metamaterial structure, which can resonate with two wavelengths unlike conventional metamaterial structures that resonate with a single wavelength, includes a substrate, a quantum dot layer, and a resonance layer formed between the substrate and the quantum dot layer and having two rectangular holes which are formed to cross each other so that resonance occurs at two different resonance wavelengths.

9 Claims, 2 Drawing Sheets

METAMATERIAL STRUCTURE

CROSS REFERENCE TO RELATED APPLICATION

This application claims the benefit of Korean Patent Application No. KR 10-2013-0112606, filed Sep. 23, 2013, which is hereby incorporated by reference in its entirety into this application.

BACKGROUND OF THE INVENTION

1. Technical Field

The present invention relates to a metamaterial structure, and more particularly, to a metamaterial structure which enables adjacent quantum dots to be efficiently excited.

2. Description of the Related Art

A metamaterial is an artificial material that is able to exhibit desired properties when the unit structure of the material is manipulated.

Recently, many scientists have been researching metamaterials, and particularly in optical fields, attempts have been made to achieve properties such as a negative refractive index, etc. that do not occur in nature, using metamaterials.

As for interactions between light and metamaterials, the size of the unit structure of the metamaterial should be considerably smaller than the wavelength of light. The structures, much smaller than the wavelength of light, interact with electromagnetic waves, and thereby a metamaterial having specific macroscopic properties may be provided. Recently, with the great development of nanoscience, a nanometer-sized material may be designed as desired, making it possible to manufacture a metamaterial which interacts with visible light.

Meanwhile, quantum dots typically have a size ranging from ones to tens of nanometers, and interact with electromagnetic waves having wavelengths as large as tens of times the size of the quantum dots. Quantum confinement caused by the very small quantum dots has an influence on the quantum energy state and thus enables interactions with electromagnetic waves at various wavelengths. Thereby, any type of quantum dots may absorb UV light to thus produce light of different colors in the visible range, depending on the size of the quantum dots.

When quantum dots are excited and thus light is radiated, they are greatly affected by peripheral environments. In particular, in the case where quantum dots are located on a metallic substrate, radiation of light is suppressed due to Purcell effects. Also, in the case where they are placed on a dielectric substrate, radiated light is mostly focused toward the dielectric substrate, making it difficult to actually utilize the produced light.

Upon performing tests using quantum dots and fabricating test devices therefor, quantum dots have to be fixed so as not to move. However, in the case where quantum dots are located on a typical dielectric or metal substrate, as mentioned above, there may be difficulty in efficiently utilizing light emitted from the quantum dots.

A metamaterial typically has a metal hole structure. The important features generated upon interaction with light such as resonance wavelength, etc. are determined by the size and shape of the hole and the materials (a dielectric substrate, etc.) around the metal hole. For example, in the case of a rectangular hole structure, the length of a long side thereof plays a role in determining a resonance wavelength. Typically, at terahertz (THz)-waves or microwaves, the hole structure resonates with the wavelength two times the length of the long side of the rectangular hole.

However, because a metal does not function as an ideal conductor in the visible range, the rectangular hole having a size of tens to hundreds of nanometers resonates with light at a wavelength longer than two times the length of the long side of the rectangular hole. The factor which affects resonance, in addition to the long side of the rectangular hole, is a dielectric substrate which may be located under the metal hole. In this case, resonance red-shifts in proportion to a refractive index of the substrate.

In a structure in which the quantum dots and the hole type metamaterial are combined, when the metamaterial resonates with the wavelength of light which excites quantum dots, external light energy may be efficiently supplied to the quantum dots. On the other hand, when the metamaterial resonates with the wavelength of light excited from the quantum dots, light produced by the quantum dots may be well extracted without suppression of radiation due to Purcell effects. Most typical metamaterials resonate and operate at a single wavelength. However, in the case where the metamaterial may cause resonance at both of two different wavelengths (a wavelength that excites quantum dots and a wavelength of light produced by the quantum dots) at a very local position where quantum dots are placed, this is regarded as a method able to very efficiently utilize the quantum dots.

In a related technique, a metamaterial having negative permittivity and dielectric constant is embodied using SRR (Split Ring Resonator) or double SRR, as disclosed in US Patent Application Publication No. 2010-0067091 (Metamaterials).

The invention disclosed in US Patent Application Publication No. 2010-0067091 (Metamaterials) may accomplish desired properties at a single wavelength.

In another related technique, a dual-band resonant metamaterial operating at terahertz waves using a tunable H-shaped resonator made of gold is disclosed in a treatise [APPLIED PHYSICS LETTERS 93, 191110 (2008)] (title; A dual-resonant terahertz metamaterial based on single-particle electric-field-coupled resonators, Yu Yuan et al.).

The above treatise pertains to a metamaterial operating at terahertz waves, and is independent of quantum dot utilization.

SUMMARY OF THE INVENTION

Accordingly, the present invention has been made keeping in mind the above problems encountered in the related art, and an object of the present invention is to provide a metamaterial structure, which may simultaneously cause resonance at a wavelength of light that excites quantum dots and a wavelength of light produced by the quantum dots in a local space where quantum dots are located.

In order to accomplish the above object, a preferred aspect of the present invention provides a metamaterial structure, including a substrate, a quantum dot layer, and a resonance layer formed between the substrate and the quantum dot layer and having two rectangular holes which are formed to cross each other so that resonance occurs at two different resonance wavelengths.

Preferably, the two different resonance wavelengths include a resonance wavelength of incident light which excites quantum dots of the quantum dot layer and a resonance wavelength of light produced by the excited quantum dots.

Preferably, the length of the long side of one of the two rectangular holes is calculated by a resonance wavelength equation of incident light which excites the quantum dots, and the length of the long side of the other of the two rectangular holes is calculated by a resonance wavelength equation of light produced by the excited quantum dots.

Preferably, the two different resonance wavelengths are calculated by the following equation: (Resonance wavelength)=$\alpha$*(length of a long side)+$\beta$, and the length of the long side is a length of a long side of each of the two rectangular holes, and the length of the long side may be 70~250 nm. In the above equation, the $\alpha$ is the proportional constant for a relation between the resonance wavelength and the length of the long side, and the $\beta$ is the correction value for correcting an error caused between the resonance wavelength and the length of the long side. Also in the above equation, the values $\alpha$ and $\beta$ vary depending on the kind of metamaterial structure and dielectric substrate. When the metamaterial structure is aluminum and the dielectric substrate has a refractive index of 1.5, $\alpha$ and $\beta$ may be set to 3.1 and 97, respectively.

Preferably, the two rectangular holes are orthogonal to each other and thus provided in the form of a cross shape.

Preferably, the long side of each of the two rectangular holes is a different length.

Preferably, the resonance layer is formed of conductive material such as metals (ex. aluminum, gold, silver), alloys (ex. gold-cadmium), 2-dimensional materials (ex. graphene, transition-metal dichalcogenides), topological insulator, or of their hybrid type structures.

Preferably, the resonance layer resonates with incident light of UV range, and simultaneously resonates with light of visible range which is excited from the quantum dots.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
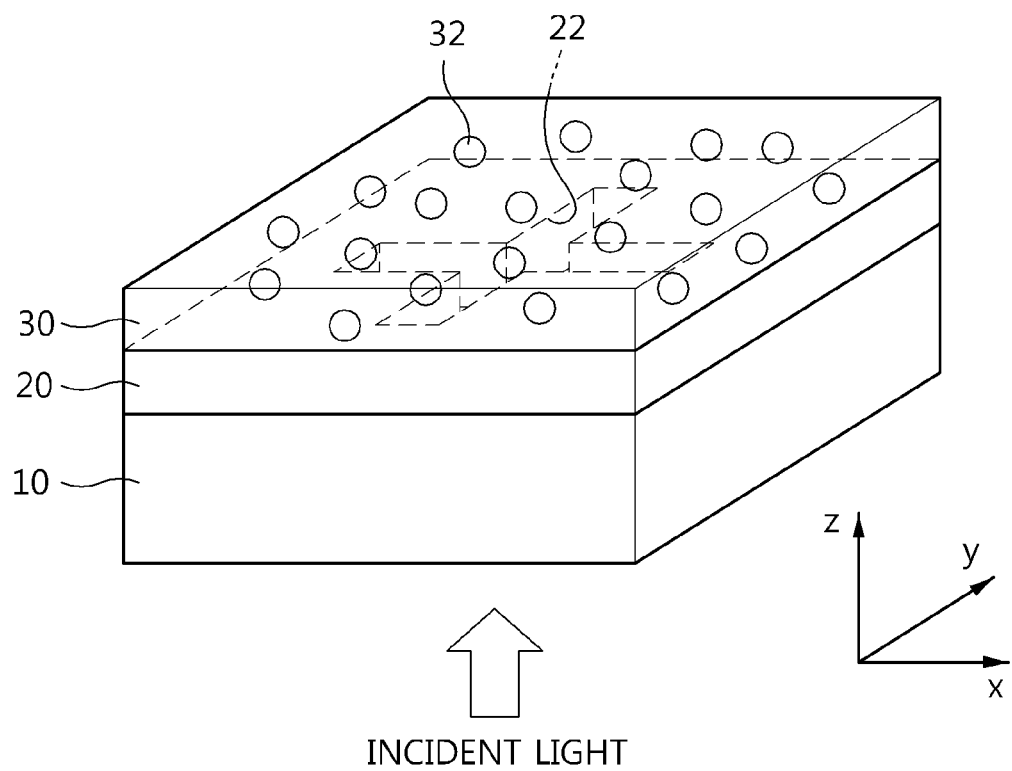
FIG. 1 is a view illustrating a metamaterial structure according to an embodiment of the present invention.

The present invention may be variously modified and may have a variety of embodiments, and specific embodiments are depicted in the drawings and described in detail.

However, such embodiments are not construed as limiting the present invention, and are to be understood to include all modifications, equivalents or substitutions incorporated into the spirit and the scope of the present invention.

The terminology used herein is for the purpose of describing particular embodiments only and is not intended to be limiting. As used herein, the singular forms are intended to include the plural forms as well, unless the context clearly indicates otherwise. It will be further understood that the terms "comprise", "include", "have", etc. when used in this specification, specify the presence of stated features, integers, steps, operations, elements, components, or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, a detailed description will be given of preferred embodiments of the present invention with reference to the appended drawings. In the following description, to facilitate full understanding of the present invention, the same reference numerals are used to designate the same or similar elements, and a redundant description for the same elements is omitted.

Figure 2:
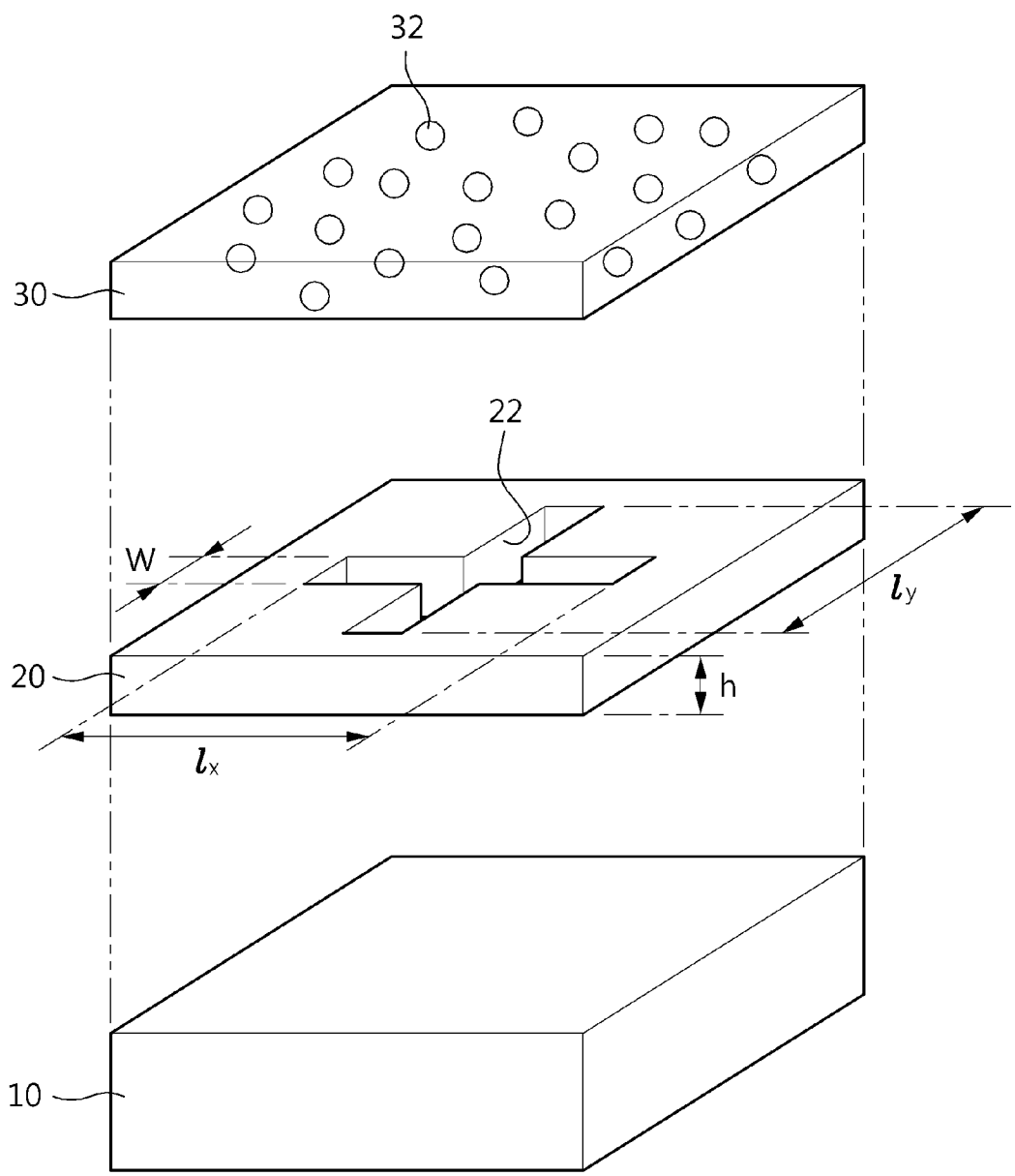
FIG. 2 is an exploded perspective view of FIG. 1.

FIG. 1 is a view illustrating a metamaterial structure according to an embodiment of the present invention, and FIG. 2 is an exploded perspective view of FIG. 1.

The present invention is embodied to efficiently utilize quantum dots. In terms of energy, quantum dots are the most efficiently utilized in such a manner that light energy supplied to quantum dots is transferred to the quantum dots as efficiently as possible and the intensity of light produced by the quantum dots is maximized Because the wavelength of light that excites quantum dots is different from the wavelength of light that is produced by the quantum dots, a metamaterial is designed so as to simultaneously cause resonance at both of two different wavelengths.

To this end, the embodiment of the present invention includes, as illustrated in FIGS. 1 and 2, a substrate 10, a resonance layer 20, and a quantum dot layer 30.

The substrate 10 may be a monolayer substrate including a single dielectric, or a multilayer substrate including one or more different dielectrics. The dielectric of the substrate 10 may be an insulation material or a semiconductor material. Incident light (preferably, light of UV range) is incident on the substrate 10.

The resonance layer 20 is formed to a predetermined thickness on the substrate 10. Two rectangular holes are formed to cross each other at the center of the resonance layer 20. Preferably, two rectangular holes are orthogonal to each other, thus forming a cross-shaped hole 22.

As the resonance layer 20 is formed by the two rectangular holes orthogonal to each other, it has two different resonance wavelengths at a very local cross position. As such, the two different resonance wavelengths may include a resonance wavelength of incident light that excites quantum dots 32 of the quantum dot layer 30 and a resonance wavelength of light produced by the excited quantum dots 32.

For example, of two rectangular holes, the length (e.g. $l_x$) of a long side of one may be calculated by a resonance wavelength equation of incident light that excites the quantum dot 32, and the length $l_y$ of a long side of the other may be calculated by a resonance wavelength equation of light produced by the excited quantum dots 32.

The equation for calculating the different resonance wavelengths may be represented by "(resonance wavelength)= 3.1*(length of long side)+97" when the resonance layer 20 is aluminum and the refractive index of the substrate 10 is 1.5. The length of the long side can be about 70~250 nm. As such, 70~250 nm corresponds to the range in which resonance may occur efficiently in the UV range.

The "resonance wavelength" equation is formed when both the width (w) of the hole and the thickness (h) of the resonance layer 20 are 50 nm. Thus, when the metamaterial structure is changed, the above equation is changed. The above equation and the specific length value of the metamaterial of the present invention are illustratively proposed to aid understanding of the present invention, and the lengths $l_x$, $l_y$ of the holes may vary depending on the quantum dots 32 to be excited.

In order for the resonance layer 20 to have two different resonance wavelengths, the lengths $l_x$, $l_y$ of the long sides of two rectangular holes should be preferably different. As illustrated in FIG. 2, the resonance conditions of the metamaterial are determined by the lengths $l_x$, $l_y$ of the long sides of the two rectangular holes, wherein such lengths are preferably different. When inherent optical properties of the quantum dots 32 are determined, they may be sufficiently inferred from the above "resonance wavelength" equation or the modified equation depending on changes in the structure.

Thus, electromagnetic properties of the metamaterial structure according to the embodiment of the present invention are closely associated with the resonance wavelengths of two rectangular holes which are orthogonal to each other. The metamaterial structure according to the embodiment of the present invention may resonate at a resonance wavelength of a rectangular hole having a length $l_x$ of its long side and a resonance wavelength of a rectangular hole having a length $l_y$ of its long side.

The resonance layer 20 may be formed of any one of gold, silver, aluminum or various alloys. Because aluminum has a higher metallic property in the UV range compared to gold and silver, it is more favorable in terms of designing and manufacturing the structure. As such, such a high metallic property means that it is difficult for UV light to pass through aluminum, compared to gold and silver.

The quantum dot layer 30 is formed on the upper surface of the resonance layer 20. The quantum dot layer 30 includes a plurality of quantum dots 32 having a size of ones to tens of nanometers. Actually, because the quantum dot layer 30 is formed by spraying the quantum dots 32 on the resonance layer 20, it may not be formed at a uniform thickness as illustrated in FIGS. 1 and 2. The resonance layer 20 may play a role as a support for aiding radiation of light while fixing the quantum dots 32.

The quantum dots 32 typically absorb UV light and emit visible light. Thus, in order to efficiently excite the quantum dots 32, a metamaterial (i.e. a material for the resonance layer 20) which resonates in the UV range is required. The metamaterial may include gold, silver, aluminum, etc., and the use of aluminum is more advantageous compared to gold and silver as mentioned above.

For example, in the case where the resonance layer 20 having a thickness of 50 nm with a single rectangular hole having a width w of 50 nm is formed of an aluminum thin film on a dielectric having a refractive index of 1.5, the resonance wavelength of the metamaterial structure may be determined by the above equation ((resonance wavelength)=3.1*(length of a long side)+97" (length unit: nm). As such, the length of the long side may fall in the range of 70~250 nm.

If the light absorption and emission wavelengths of the quantum dots 32 to be excited are known, the rectangular hole structures resonating at respective wavelengths may be deduced from the above equation. Thus, when two rectangular hole structures the lengths of which are different are disposed to be orthogonal to each other, the metamaterial structure according to the embodiment of the present invention may result.

As illustrated in FIG. 2, when the lengths of the cross-shaped two long sides are $l_x$ and $l_y$, respectively, one side may be matched to the resonance conditions of light that excites the quantum dots, and the other side may be matched to the resonance conditions of light produced by the quantum dots. Thereby, the cross-shaped metamaterial structure may be completed, which promotes excitation of the quantum dots.

As illustrated in FIG. 1, when light at a wavelength that excites the quantum dots 32 is incident, such light (incident light) resonates with the metamaterial structure, so that the electromagnetic waves of the metamaterial structure may be strongly induced. Specifically, when light at a wavelength that excites the quantum dots 32 is incident, either of two rectangular holes, which is matched to the resonance condition (i.e. resonance wavelength) of light that excites the quantum dots 32, may cause resonance at the wavelength of incident light, thus strongly inducing the electromagnetic waves.

So, the quantum dots 32 receive energy from the induced strong electromagnetic waves and thus may emit light at a different wavelength. In this case, the emitted light resonates with the other of two rectangular holes, which is matched to the resonance condition of light produced by the quantum dots 32, and may thus be radiated in a large amount.

As described hereinbefore, the present invention provides a metamaterial structure. According to the present invention, the metamaterial structure can resonate with both wavelengths, unlike conventional metamaterial structures that resonate with only a single wavelength. Therefore, the amount of produced light relative to energy supplied to quantum dots can be increased.

Thus, because energy efficiency can be increased, the present invention can have a great influence in the area of industrial lighting, such as OLEDs, etc.

On the other hand, even when light is absorbed, the cross-shaped resonance structure according to the present invention can function and thus can contribute to development of future technology such as solar light cells, etc.

As described above, the optimum embodiments have been disclosed in the drawings and the specification. Although the specific terms have been used herein, they have been used merely for the purpose of describing the present invention, and have not been used to limit the meanings thereof and the scope of the present invention set forth in the claims. Therefore, it will be understood by those having ordinary knowledge in the art that various modifications and other equivalent embodiments can be made. As a result, the technical range of the protections of the present invention should be defined by the technical spirit of the attached claims.

What is claimed is:

1. A metamaterial structure, comprising:
    a substrate;
    a quantum dot layer; and
    a resonance layer formed between the substrate and the quantum dot layer and having two rectangular holes which are formed to cross each other so that resonance occurs at two different resonance wavelengths.

2. The metamaterial structure of claim 1, wherein the two different resonance wavelengths comprise a resonance wavelength of incident light which excites quantum dots of the quantum dot layer and a resonance wavelength of light produced by the excited quantum dots.

3. The metamaterial structure of claim 2, wherein a length of a long side of one of the two rectangular holes is calculated by a resonance wavelength equation of incident light which excites the quantum dots, and
    a length of a long side of the other of the two rectangular holes is calculated by a resonance wavelength equation of light produced by the excited quantum dots.

4. The metamaterial structure of claim 1, wherein the two different resonance wavelengths are calculated by the following equation:

(Resonance wavelength)=α*(length of a long side)+β, wherein the α is a proportional constant for a relation between the resonance wavelength and the length of the long side, and the β is a correction value for correcting an error caused between the resonance wavelength and the length of the long side, and the length of the long side is a length of a long side of each of the two rectangular holes.

5. The metamaterial structure of claim 4, wherein the length of the long side is 70~250 nm.

6. The metamaterial structure of claim 1, wherein the two rectangular holes are formed to be orthogonal to each other.

7. The metamaterial structure of claim 1, wherein the long side of each of the two rectangular holes is a different length.

8. The metamaterial structure of claim 1, wherein the resonance layer comprises conductive materials, the conductive materials include at least one of metals, alloys, 2-dimensional materials, topological insulators and hybrid type structures.

9. The metamaterial structure of claim 1, wherein the resonance layer resonates with light of UV range and light of visible range.

* * * * *